(12) United States Patent
Weber

(10) Patent No.: US 6,237,991 B1
(45) Date of Patent: May 29, 2001

(54) PASSENGER COMPARTMENT SIDE COLLISION PROTECTION ASSEMBLY

(75) Inventor: Norbert Weber, Bondorf (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 09/377,690

(22) Filed: Aug. 20, 1999

(30) Foreign Application Priority Data

Aug. 29, 1998 (DE) .............................................. 198 39 519

(51) Int. Cl.$^7$ ................................. B60N 2/42; B60N 2/02
(52) U.S. Cl. ..................... 296/188; 296/68.1; 296/146.6; 297/216.1
(58) Field of Search .................. 296/68.1, 188, 296/146.6; 297/216.1

(56) References Cited

U.S. PATENT DOCUMENTS

| | | | |
|---|---|---|---|
| 3,944,276 | * | 3/1976 | De Rosa et al. ...................... 296/188 |
| 3,964,208 | * | 6/1976 | Renner et al. ..................... 296/146.6 |
| 4,231,607 | | 11/1980 | Bohlin ..................................... 296/63 |
| 4,293,160 | * | 10/1981 | Lutze et al. ....................... 296/146.6 |
| 4,396,220 | * | 8/1983 | Dieckmann et al. ............... 296/68.1 |
| 4,512,604 | * | 4/1985 | Maeda et al. ........................ 296/68.1 |
| 4,558,900 | * | 12/1985 | Nagata .................................. 296/63 |
| 5,000,509 | * | 3/1991 | Sinnhuber et al. ................... 296/188 |
| 5,221,121 | * | 6/1993 | Zichner et al. ....................... 296/188 |
| 5,407,244 | * | 4/1995 | Nakano et al. ...................... 296/68.1 |
| 5,433,478 | * | 7/1995 | Naruse ............................... 296/146.6 |
| 5,435,618 | * | 7/1995 | Sacco et al. .......................... 296/188 |
| 5,536,038 | | 7/1996 | Bollaert et al. ..................... 280/730.2 |
| 5,573,298 | * | 11/1996 | Walker et al. ..................... 296/146.6 |
| 5,584,525 | * | 12/1996 | Nakano et al. ...................... 296/68.1 |
| 5,603,548 | * | 2/1997 | Gandhi et al. ...................... 296/146.7 |
| 5,716,094 | | 2/1998 | Bhalsod et al. ....................... 296/188 |
| 5,938,265 | * | 8/1999 | Oyabu et al. ........................ 296/68.1 |
| 6,113,185 | * | 9/2000 | Yamaguchi et al. ................. 296/68.1 |

FOREIGN PATENT DOCUMENTS

| | | |
|---|---|---|
| 36 07 855 | 9/1987 | (DE) . |
| 29509229U1 | 12/1995 | (DE) . |
| 195 21 888 | 11/1996 | (DE) . |
| 0470413A1 | 2/1992 | (EP) . |

\* cited by examiner

Primary Examiner—D. Glenn Dayoan
Assistant Examiner—H. Gutman
(74) Attorney, Agent, or Firm—Evenson, McKeown, Edwards & Lenahan, P.L.L.C.

(57) ABSTRACT

A passenger compartment of a vehicle body has a protective device that protects the vehicle occupants in a side collision. The protective device being integrated into each vehicle door, each vehicle seat, and into the center console fastened to the body floor and including reinforcing elements extending transversely to the lengthwise axis of the compartment. Impact plates are located between the elements, all of which elements lie in a horizontal plane and abut one another by the impact plates in the event of a side collision. The protective device is configured so that as soon as the lateral deformation of the passenger compartment begins in a crash, the reinforcing elements form a continuous cross member for accepting the force. At least one of the reinforcing elements that abut one another transversely to the lengthwise axis of the compartment in a side collision is designed so that it can be increased to a maximum length, in such fashion that all the gaps that exist between the reinforcing elements and the impact plates in the pre-collision state of the passenger compartment disappear. An actuator that can be actuated in the event of a collision adjusts the at least one reinforcing element to this maximum length.

31 Claims, 6 Drawing Sheets

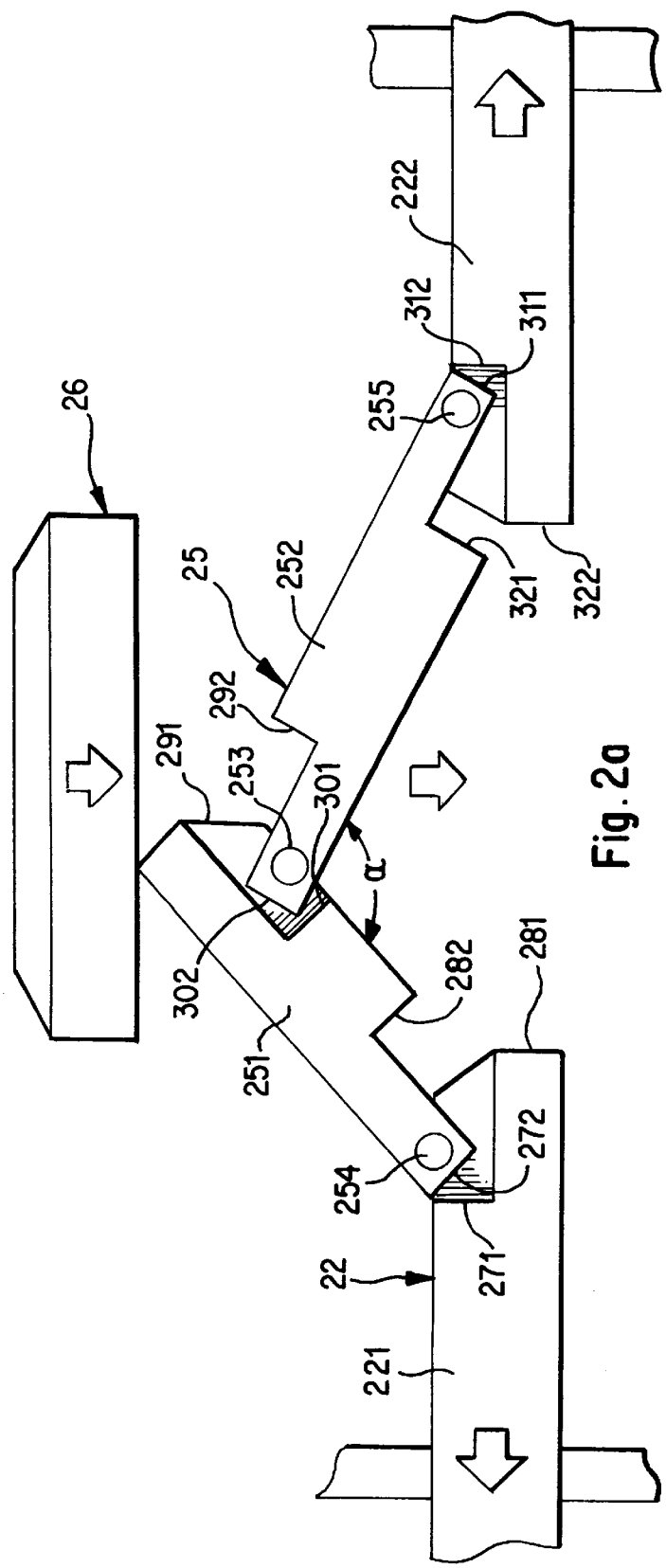
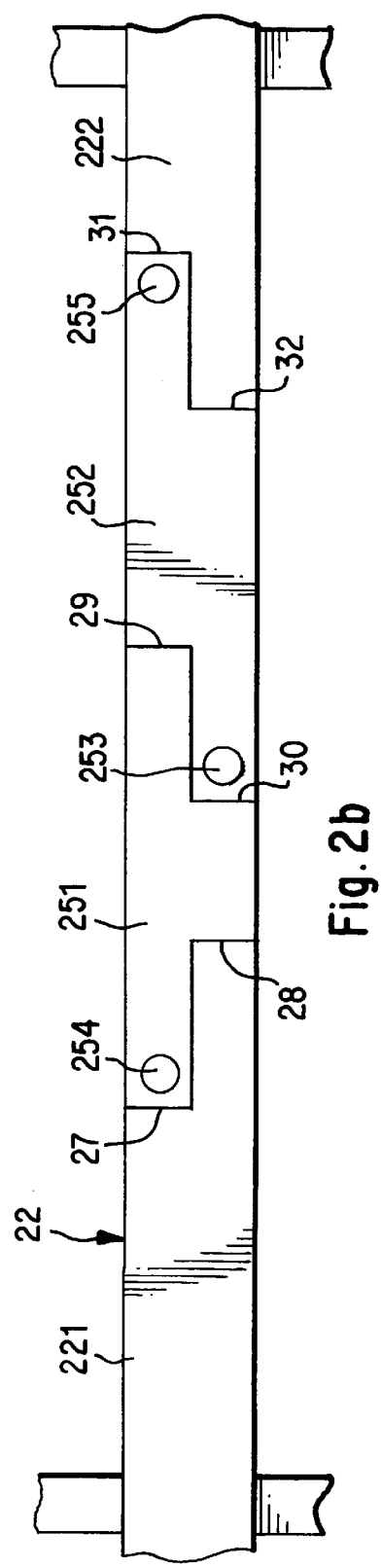
Fig. 2a
Fig. 2b

PASSENGER COMPARTMENT SIDE COLLISION PROTECTION ASSEMBLY

This application claims the priority of German application 198 39 519.1, filed in Germany on Aug. 29, 1998, the disclosure of which is expressly incorporated by reference herein.

BACKGROUND AND SUMMARY OF THE INVENTION

The invention relates to a passenger compartment of a vehicle body having two laterally spaced vehicle doors, at least one longitudinally displaceable vehicle seat between the doors and side collision protection devices in the form of laterally extending reinforcing elements integrated in the vehicle doors and seat.

In such passenger compartments, known for example from German Patent Document DE 28 16 318 C2, with a protective device in the event of a side crash, unavoidable spaces exist between the reinforcing elements that are caused by the lengthwise displaceability of the vehicle seats and the pivotability of the vehicle doors. In a side crash, the reinforcing elements abut one another by their impact plates in the direction transverse to the lengthwise axis of the compartment, said spaces having first to be eliminated by the deformation of structural parts in a side crash before the "crash-locked" reinforcing elements act as a unit on the passenger compartment structure and act as continuous cross members to accept the forces from the side and transmit them to the entire body.

In a known vehicle seat (European Patent Document EP 0 470 413 A1), the protective device has a safety element located in the seat, said element being moved approximately horizontally into an operating position automatically from its resting position inside the seat by a device in case of danger. In the operating position, the safety elements extend up to parts of the vehicle that laterally abut the seat, for example the door sills or the center column, and abut them.

In a likewise known vehicle seat (German Patent Document DE 295 09 229 U1), the protective device comprises side protection telescopes built into the front seats, said telescopes being extended when the seat belt is put on, with the telescopes abutting the inside walls of the body on one side and abutting one another on the other side, forming a continuous cross member that stiffens the passenger compartment in the transverse direction. Each side protection telescope in one embodiment consists of two threaded rods that can be screwed by their ends into internally threaded sections of a threaded sleeve with opposite thread pitches. The threaded sleeve is caused to rotate by a worm wheel.

A goal of the invention, in a passenger compartment of the species recited at the outset, is to improve the protective device for protecting the vehicle occupants in a side crash in such fashion that the reinforcing elements are crash-locked no later than the beginning of the lateral deformation of the passenger compartment in a crash, and form a continuous cross member to accept the forces.

This goal is achieved according to the invention by providing a passenger compartment of the above noted type, wherein at least one of the reinforcing elements exhibits an increasable length such that precollision gaps between the reinforcing elements are automatically closed by at least one collision responsive actuator operable to lengthen the at least one of said reinforcing elements so that all reinforcing elements between a respective pair of side doors operably abut one another during side collision absorbing conditions.

The passenger compartment according to preferred embodiments of the invention has the advantage that in the event of a crash, as a result of the actuator being triggered by suitable sensors, a continuous cross member is formed immediately from the individual reinforcing elements with impact plates located therebetween, said members accepting the forces from the crash side and transmitting them to the entire body and hence to the opposite side as well. Thus, at the moment of the crash, as a result of the elongation of at least one reinforcing element, all the spaces between the reinforcing elements and the impact plates are abruptly eliminated, so that before any body deformation begins, all of the reinforcing elements and impact plates abut one another in the transverse direction with no gaps.

Advantageous designs of the vehicle body according to the invention with advantageous embodiments and improvements on the invention are described herein and in the claims.

Other objects, advantages and novel features of the present invention will become apparent from the following detailed description of the invention when considered in conjunction with the accompanying drawings.

BRIEF DESCRIPTION OF THE DRAWINGS

FIG. 2a is an enlarged view of section II in FIG. 1 showing a reinforcing element of the protective device in a precollision absorbing condition;

FIG. 2b is an enlarged view of section II in FIG. 1 showing a reinforcing element of the protective device in a collision absorbing condition;

DETAILED DESCRIPTION OF THE DRAWINGS

Figure 1:
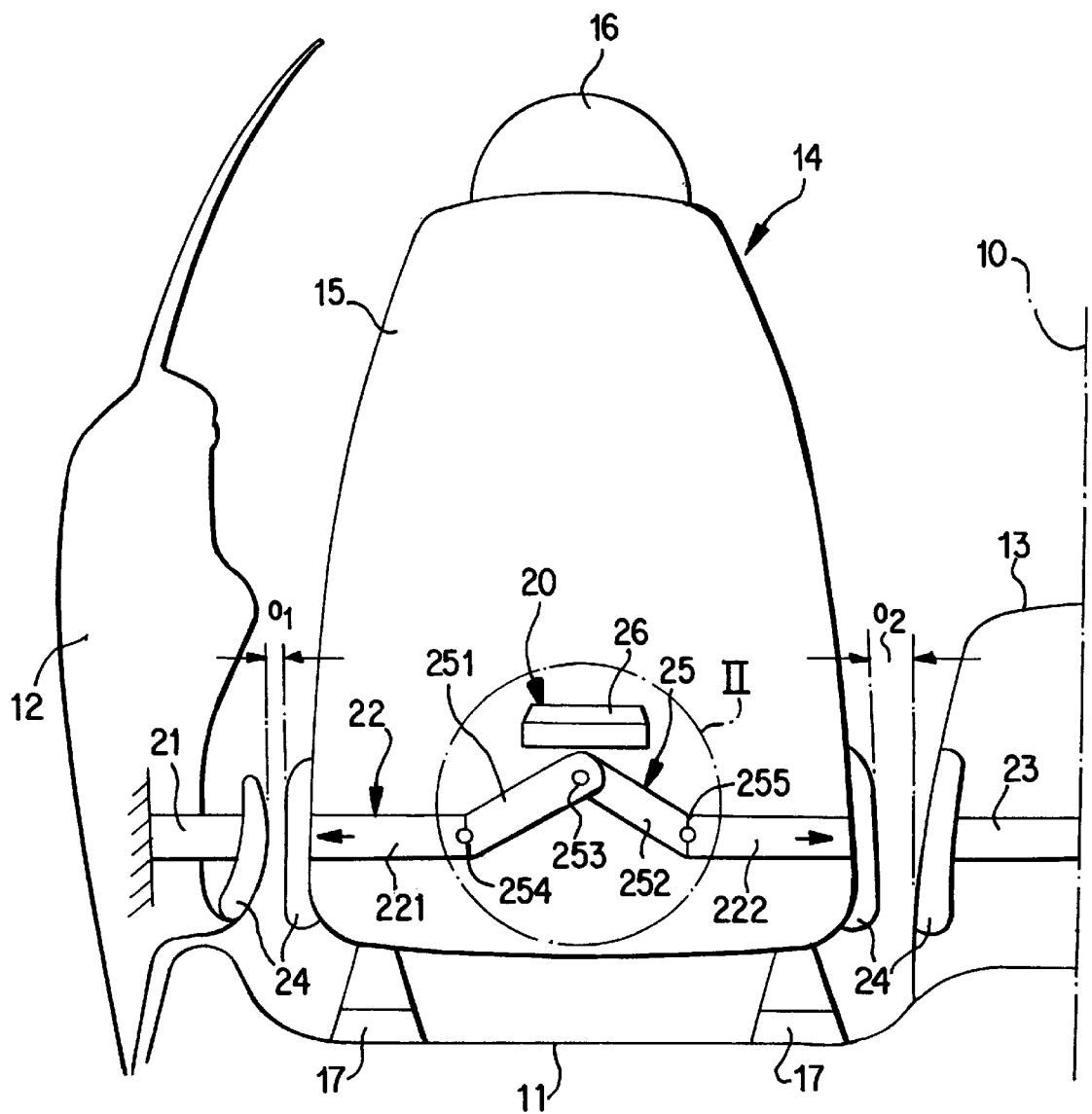
FIG. 1 is a schematic view which shows a portion of a cross section through a passenger compartment of a vehicle body with a built-in vehicle seat in a rear view and an integrated protective device constructed according to preferred embodiments of the present invention, and shown in a condition before a side collision.

In FIG. 1, a passenger compartment of a vehicle body is shown schematically in cross section and partially up to the central plane of symmetry 10 of the passenger compartment. The vehicle floor 11, left vehicle door 12, and center console 13 mounted centrally on the body floor can be seen in the passenger compartment. A left vehicle seat 14, the driver's seat for example, is located between vehicle door 12 and center console 13, of which seat only the back 15 and the headrest 16 can be seen in FIG. 1. Vehicle seat 14 is mounted lengthwise displaceably on body floor 11 and can be locked in any lengthwise displacement position. The guide rails fastened to body floor 11 for this purpose are marked 17 in FIG. 1. To complete the cross section of the passenger compartment, FIG. 1 can be completed by adding the right-hand compartment half symmetrically to central plane 10 so that in the same way, a right-hand vehicle door 12 and a right-hand vehicle seat 14, for example the passenger seat, are provided.

To protect seat users against life-threatening injuries in the event of a side collision, a protective device assembly 20 is provided that has a plurality of reinforcing elements extending transversely to the central plane 10 of the passenger compartment. One reinforcing element 21 is integrated into each vehicle door 12, one reinforcing element 22 is integrated into each vehicle seat 14, and one reinforcing element 23 is integrated into the center console 13. Impact plates 24 are located at the ends of the reinforcing elements 21 that face one another, so that in each case, in the spaces between each vehicle door 12 and each vehicle seat 14 on the one hand and each vehicle seat 14 and the center console 13 on the other, two impact plates 24 are located opposite one another at distances a1 and a2. While the reinforcing elements 22, 23 in the vehicle seat 14 and in the center console 13 are provided with impact plates 24 at each end, the reinforcing elements 21 in the vehicle doors 12 are fitted with impact plates 24 only on the inner ends and abut the doors by the outer ends.

Reinforcing elements 21–23 are designed as profiles made of high-strength material, metal or KEVLAR for example to save weight, and provided with the necessary ribs and reinforcements. It is understood that the design of the reinforcing elements 21, 23 and impact plates 24 described above as being integrated into vehicle door 12 and into center console 13 as separate parts is not absolute. Instead, the reinforcing element 21 can be designed with impact plate 24 as part of the design of a vehicle door 12 in the form of reinforcing panels, so that an impact zone is produced which extends as part of the door structure over at least the length of the seat adjustment travel and hence offers the desired protection in every seat adjustment position. The impact area of the impact zone need not be identical to the surface of the door panel but can be located further down so that in the event of a side collision involving destruction of the door pocket for example, the reinforcing element 22 with impact plates 24 in vehicle seat 14 comes to rest against the impact zone in vehicle door 12.

The same is true of center console 13. Here it would be possible to make the center console 13 as a built-in part with a high-strength structure made of ribs, reinforcements, etc., which conducts the forces further in the event of a side collision. Alternatively, the center console 13 can be provided within certain zones on its side flanks with massive reinforcements that form the impact plates 24, said reinforcements taking the lengthwise and vertical adjustment of vehicle seat 14 into account. The two reinforcements are connected with one another by a frame or the like in such fashion that the forces are conducted further. In addition, reinforcing element 23 with impact plate 24 can be formed in center console 13 as a rigid structure secured by the center tunnel to the floor pan, with the center console 13 located above as a cover.

If, for design reasons, the reinforcing elements 21 and 23 designed as described above with impact plates 24 in vehicle doors 12 and in center console 13 are not made flat in the vicinity of their impact zones but with "sloping" contours instead, joints are advantageously provided between the reinforcing elements 22 in vehicle seats 14 and their impact plates 24, said joints then permitting optimum support of the impact plates 24 in the diagonal impact zones of a vehicle door 12 and center console 13.

While the reinforcing elements 21 and 23 are designed with impact plates 24 in vehicle doors 12 and center console 13 and extending in the direction of the width of the vehicle with a fixed length, the reinforcing element 22 in the two vehicle doors 12 by contrast is designed so that it can be elongated to a maximum length. This maximum length is dimensioned so that all of the gaps a1, a2 that are present in the pre-collision state of the passenger compartment between the reinforcing elements 21–23 and impact plates 24 disappear as a result of the increase in length at the moment of a side crash. In the embodiment shown in FIG. 1, the length of the reinforcing element 22 in the left vehicle seat 14 increases at the moment of the crash by a sum a1+a2, so that the impact plates 24 of the three reinforcing elements 21–23 abut one another without any gaps.

To produce such an increase in length, reinforcing element 22 in each vehicle seat 14 has a toggle lever 25 made of two lever arms 251, 252 in the shape of a V, said levers being connected together pivotably movably in toggle joint 253. The ends of the two lever arms 251, 252 facing away from toggle joint 253 are connected by joints 254, 255 with the two sections 221, 222 of reinforcing element 22. The axes of joints 253–255 are aligned parallel to one another and run perpendicularly to the plane of the drawing in FIG. 1. The length of the two lever arms 251, 252 and of the toggle angle a enclosed by the two lever arms 251, 252 (FIG. 2a) are adjusted to one another in such fashion that when toggle lever 25 is extended (FIG. 2b), in which position the two lever arms 251, 252 and their sections 221, 222 are flush with one another, the gaps a1 and a2 between impact plates 24 disappear and therefore all the impact plates 24 abut one another without gaps and all the reinforcing elements 21–23 to the left and right of the central plane of symmetry 10 form a continuous cross member.

To activate protective device 20 in a side crash, an actuator 26 is integrated into vehicle seat 14, said actuator, when activated, exerting a compressive force on toggle joint 253 of toggle lever 25 which moves toggle lever 25 into its extended position. This actuator 26 can be designed as a pneumatic or pyrotechnic drive and is triggered by suitable sensors in a side collision so that it drives the toggle lever 25 explosively into its extended position and locks it there so that it cannot be pushed back into the original position.

In FIGS. 2a and 2b, toggle lever 25 is shown enlarged in detail, in FIG. 2a in the pre-collision state and in FIG. 2b in its extended position at the moment of the side collision. The two lever arms 251, 252 in the embodiments shown are designed asymmetrically in such fashion that in the extended position, force transmission does not take place via joints 253–255 but via all six surface pairs 27–32 that abut one another in the direction of the flow of the force. Two surface pairs 27, 28 and 31, 32 are formed between a rod section 221 or 222 and a lever arms 251 or 252 and two surface pairs 29, 30 are formed between the two lever arms 251 and 252. The individual surfaces of surface pairs 27–32 are designated in FIG. 2a by 271, 272 and 321, 322. In the event of a collision, when toggle lever 25 is in the extended position, the supporting surfaces rest flat against one another. The shape of the lever, extended or curved for example, and the number and size of the surface pairs are determined by the design and are shaped to suit requirements.

With a greater lengthwise displaceability of vehicle seat 14 on guide rails 17, it is advantageous to make the reinforcing elements 22 in vehicle seat 14 in pairs. The two reinforcing elements 22 of each pair then run parallel to one another at a distance and are fastened at their ends jointly to an impact plate 24. As a result, even in extremely different displacement positions of the two vehicle seats 14, in the event of a side crash a rigid cross member is produced between the two vehicle doors 12 which cannot bend in a lengthwise direction. Impact plates 24, as shown on the reinforcing element 23 provided in center console 13, can be integrated into the vehicle doors 12, and the vehicle seat 14 can be covered by the respective upholstery so that the interior of the passenger compartment in the pre-collision state presents an aesthetically pleasing appearance that is not disturbed by technical design elements. A tear seam is then provided in the vehicle seat 14 for the reinforcing element 22 whose length is variable in the seat upholstery in the vicinity of each impact plate 24, said seam, when the toggle lever 25 is moved into its extended position, tearing in a specified manner and thus permitting impact plate 24 to emerge from the seat upholstery.

Figure 3:
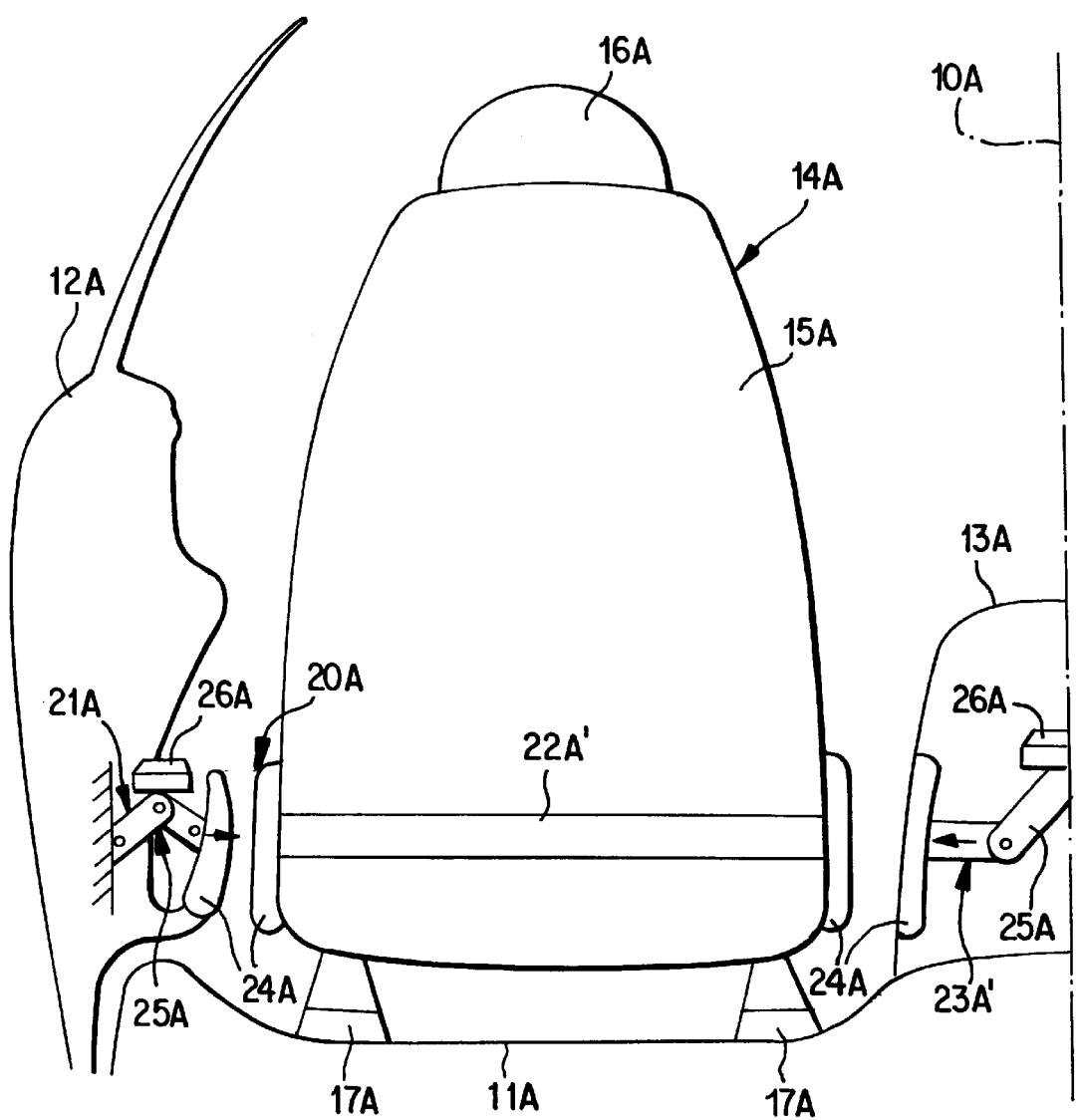
FIGS. 3 and 4 show the same view as FIG. 1 with the protective device modified in each case according to other preferred embodiments of the present invention.

The modified protective device 20A in the passenger compartment shown schematically in FIG. 3 differs from the protective device 20 described above in that the reinforcing element 22A integrated into vehicle seat 14A is made as a continuous constant-length profile with endwise impact plates 24A and the reinforcing elements 21A and 23A provided in the vehicle doors 12A and center console 13A are designed as length-variable reinforcing elements with toggle lever 25A and actuator 26A. In addition, the design and operation are the same as described in FIG. 1 so that the same parts have been given the same numbers with a suffix "A". Unless otherwise indicated the above description of FIG. 1 for these similarly numbered parts applies.

Figure 4:
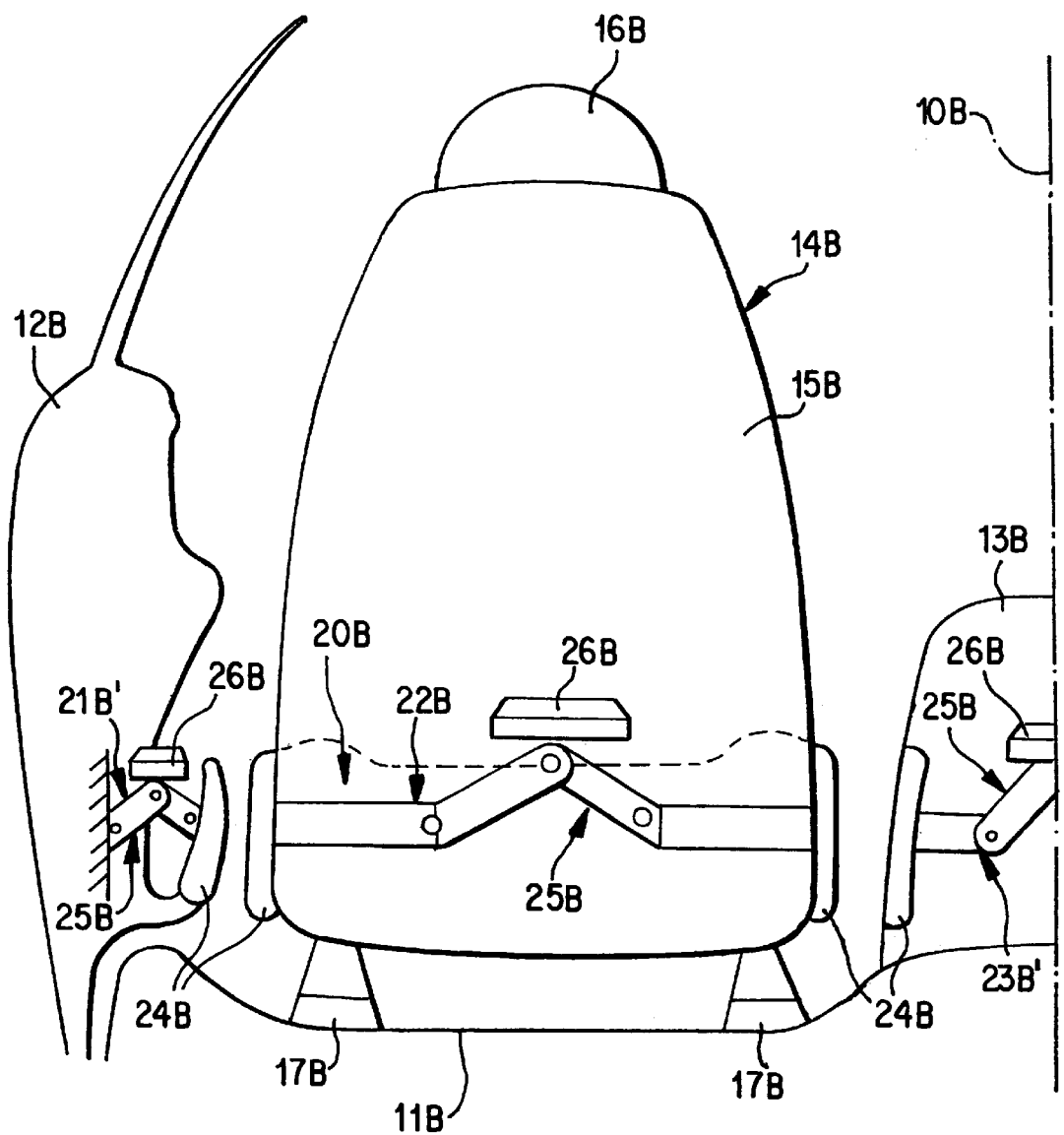
Figure 5:
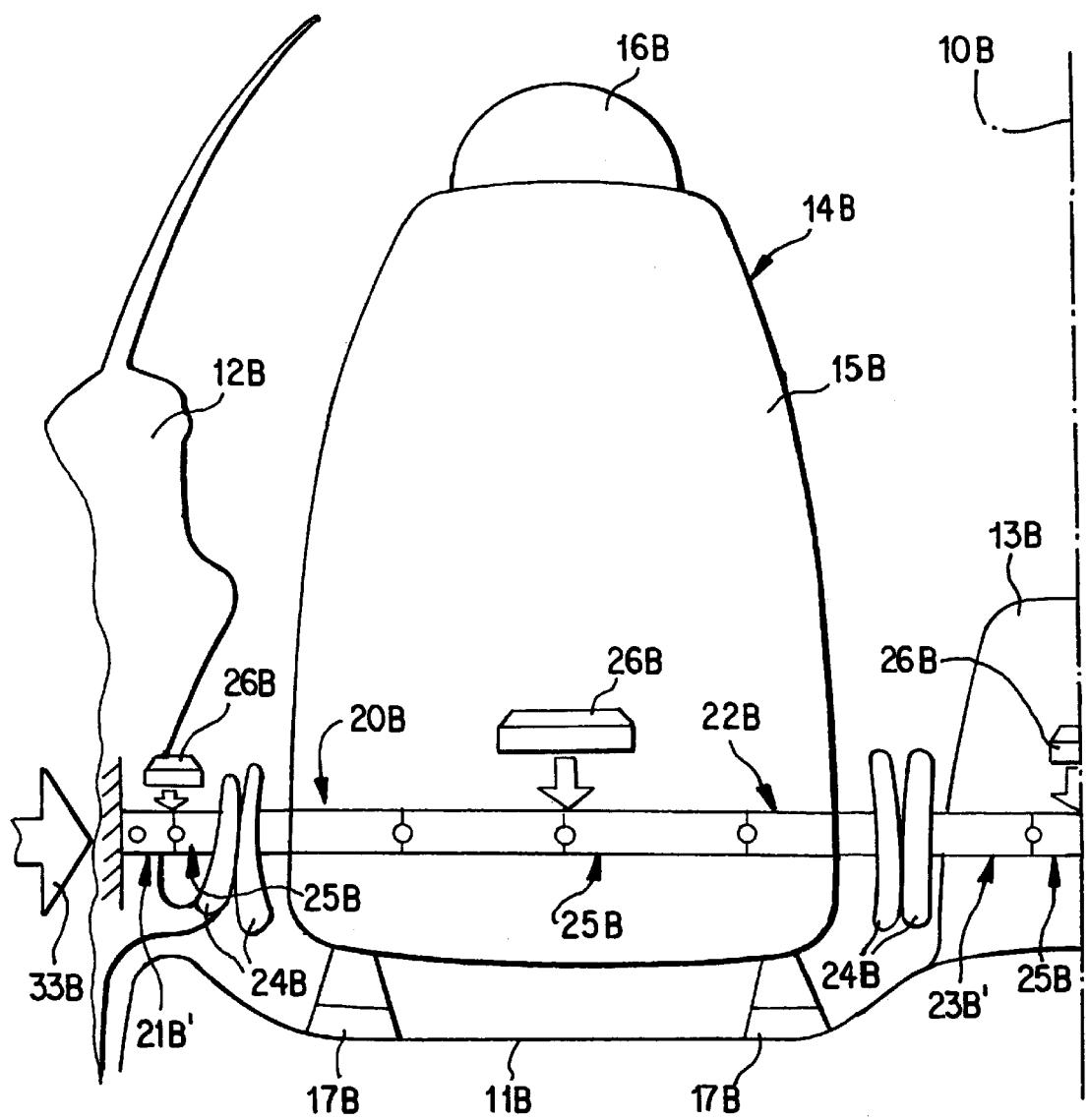
FIG. 5 shows the same view as FIG. 4 with the protective device shown activated in a side collision.

The additional embodiment of a protective device 20B for a side collision within a passenger compartment, shown in FIG. 4, differs from the two protective devices 20 and 20A described above in that all the reinforcing elements 21B, 22B, and 23B are provided with a toggle lever 25B and an actuator that drives the toggle lever 25B into its extended position, so that in a side collision, all the reinforcing elements 21B, 22B and 23B increase their lengths. In the event of a collision, all the toggle joints 25B move into their extended positions and are latched therein, as shown in FIG. 5. As is also made clear in FIG. 5, all the gaps that exist in the pre-collision state and are marked in FIG. 1 by a1, a2 disappear when the toggle levers 25B are in the extended position, so that all the impact plates 24B abut one another without gaps and the entire protective device 20B forms a rigid continuous transverse member between the two vehicle doors 12B that receives the forces on one side and transfers them to the passenger seat structure and also to the opposite side. In FIGS. 4 and 5, similarly operating parts as in FIGS. 1, 2a, 2b and 3 have similar reference numbers, with suffix "B". Unless otherwise indicated, the above description for similarly numbered parts in these and other figures apply.

FIGS. 6a, 6b and FIGS. 7a, 7b show schematically two additional embodiments of a reinforcing element with an actuator, in this case the reinforcing element 22 (22C", 22D") is integrated into vehicle seat 14 with actuator 26 (26C, 26D).

Figure 6A:
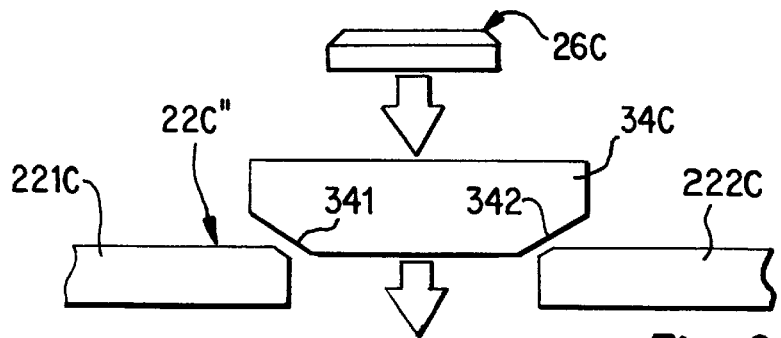
FIG. 6a shows the same view as in FIG. 2a of a reinforcing element according to a further embodiment disposed in a precollision energy absorbing condition.
Figure 6B:
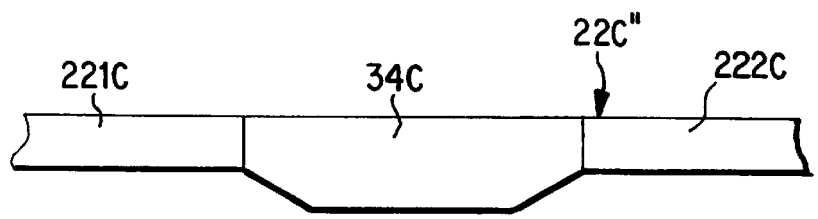
FIG. 6b shows the FIG. 6a reinforcing element in a collision absorbing condition.

In FIGS. 6a and 6b, reference numbers, with suffix "C," refer to similarly operating parts with the same reference numbers in the other Figures. Unless otherwise indicated, the above description for similarly numbered parts in the other Figures apply.

In the embodiment shown in FIGS. 6a and 6b, all of the elementary sections 221C and 222C of reinforcing element 22C", by contrast with the embodiments according to FIGS. 1–5, are not continuously connected with one another by the toggle levers but are arranged individually and at intervals below a driving and locking body 34C which is displaceable by actuator 26C transversely to elementary sections 221C, 222C and thus forces the elementary sections 221C, 222C away from one another by sloping surfaces 341 and 342 until it is flush with them and lies between them, and supports them against one another (locking). As is not shown, the two elementary sections 221C, 222C are guided axially displaceably in guides and have their ends facing one another abutting the sloping surfaces 341 and 342 of the drive and locking body 34C. In FIG. 6a, reinforcing element 22C" is shown with driving and locking body 34C before the action of actuator 26C and in FIG. 6b it is shown following the response of the actuator 26C.

Figure 7A:
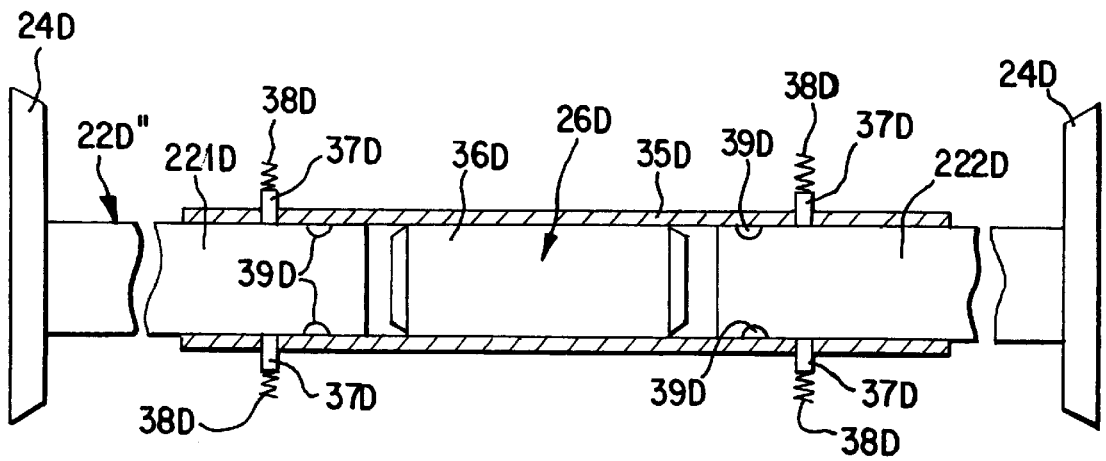
FIG. 7a is a schematic part sectional view of a reinforcing element constructed according to another preferred embodiment of the invention, and depicted in a precollision condition.
Figure 7B:
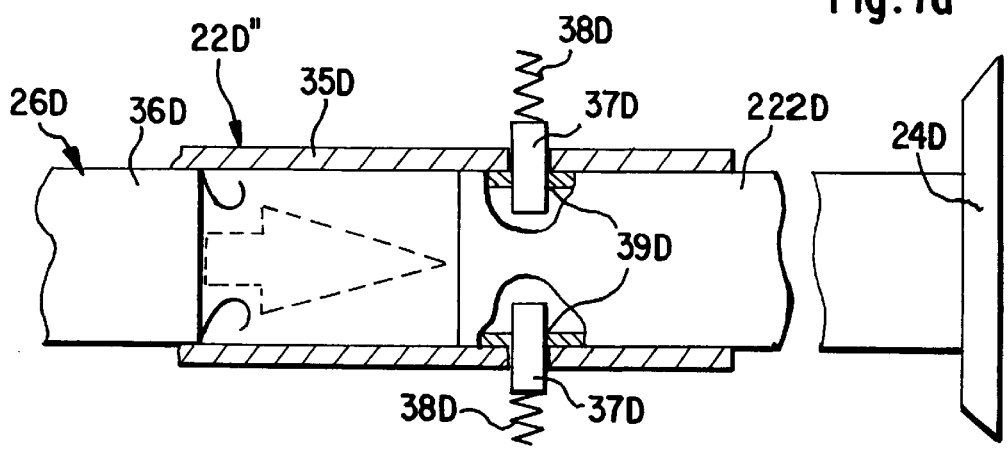
FIG. 7b is an enlarged partial view of the reinforcing element of FIG. 7a, depicting its operation and condition for absorbing side collision forces.

In FIGS. 7a and 7b, reference numbers, with suffix "D," refer to similarly operating parts with the same reference numbers in the other Figures. Unless otherwise indicated, the above description for similarly numbered parts in the other Figures apply.

The embodiment of reinforcing element 22D" sketched schematically in FIGS. 7a and 7b has the advantage of a small volume. A tubular guide profile 35D in the embodiment is secured in the vehicle seat 14 and accepts axially displaceably the two elementary sections 221D and 222D of reinforcing element 22D". Between the two elementary sections 221D and 222D, a pyrotechnic charge 36D for example is located as the actuator 26D, said charge expanding in both directions when ignited, and thereby driving both elementary sections 221D, 222D outward, so that the two impact plates 24D abut the impact plates 24 of the other reinforcing elements 21 and 23 in the vehicle door 12 and the center console 13. In this position of the elementary sections 221D, 222D, the sections are locked in guide profile 35D (FIG. 7b) so that all the reinforcing elements 21, 22, and 23 are locked by impact plates 24D. As indicated only schematically in FIGS. 7a and 7b, which show the reinforcing element 22D" before and after the operation of actuator 26D, elementary sections 221D, 222D are locked for example by the fact that a lock 37D that passes radially through guide profile 35D by the force of a locking spring 38D designed as a compression spring for example, abuts the circumference of each elementary section 221D and 222D and, in the displacement position of elementary sections 221D and 222D, engages shapewise an opening 39D made radially in the jacket surface. Lock 37D is designed so that it accepts and conducts away the forces that develop in a side collision.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. Passenger compartment of a vehicle body comprising:
   a body floor,
   at least two vehicle doors integrated into two body sides,
   a center console attached centrally to the body floor,
   a vehicle seat on each side of the center console located respectively between the center console and one of the vehicle doors, said seats being displaceable lengthwise on the body floor, and
   a protective device assembly that protects a seat user in the event of a side collision, said protective device assembly including respective reinforcing elements integrated into each said vehicle door, each said vehicle seat, and the center console, said reinforcing elements extending transversely to a lengthwise axis of the compartment, said protective device assembly also having impact plates located between said reinforcing elements, with the reinforcing elements being arranged so that in a side collision said reinforcing elements abut one another by the impact plates, wherein at least one of the reinforcing elements that abut one another in a side collision extend transversely to the lengthwise axis of the compartment and are designed for a maximum length that can be increased in such fashion that all gaps that exist in a pre-collision state of the passenger compartment between the reinforcing elements and the impact plates in a supporting direction are eliminated, and wherein an actuator is provided that can be activated in the event of a side collision, said actuator adjusting at least one of the reinforcing elements to the maximum length, and wherein at least one of the reinforcing elements has a V-shaped toggle lever, both of whose lever arms and toggle angle enclosed by the lever arms in a pre-collision state are dimensioned so that all of the gaps between the impact plates are eliminated in an extended position of the toggle lever.

2. Passenger compartment according to claim 1, wherein the lever arms abut one another in the extended position of the toggle lever by flat supporting surfaces designed on the lever arms and on sections of the reinforcing element abutting the lever arms.

3. Passenger compartment according to claim 1, wherein the actuator produces a compressive force that acts on a toggle joint, moving the toggle lever into the extended position.

4. Passenger compartment according to claim 2, wherein the actuator produces a compressive force that acts on a toggle joint, moving the toggle lever into the extended position.

5. Passenger compartment according to claim 1, wherein the toggle lever can be locked in the extended position.

6. Passenger compartment according to claim 2, wherein the toggle lever can be locked in the extended position.

7. Passenger compartment according to claim 3, wherein the toggle lever can be locked in the extended position.

8. Passenger compartment according to claim 4, wherein the toggle lever can be locked in the extended position.

9. Passenger compartment according to claim 1, wherein one of the reinforcing elements whose length can be increased is located inside each said vehicle seat.

10. Passenger compartment according to claim 1, wherein one of the reinforcing elements whose length can be increased is provided in each said vehicle door and in the center console.

11. Passenger compartment according to claim 9, wherein one of the reinforcing elements whose length can be increased is provided in each said vehicle door and in the center console.

12. Passenger compartment according to claim 1, wherein respective ones of the impact plates located on ends of the reinforcing elements that face one another each extend over a range of a predetermined seat adjustment path, including lengthwise and vertical adjustment.

13. Passenger compartment according to claim 10, wherein respective ones of the impact plates located on ends of the reinforcing elements that face one another each extend over a range of a predetermined seat adjustment path, including lengthwise and vertical adjustment.

14. Passenger compartment according to claim 1, wherein the reinforcing elements are made of a high-strength material, such as metal or KEVLAR.

15. Passenger compartment according to claim 1, wherein respective ones of the impact plates are integrated into the vehicle doors, the center console, and the vehicle seats and are covered by respective upholstery, and wherein a tear seam is provided in the upholstery in the vicinity of the impact plates.

16. A protective device assembly for a vehicle passenger compartment which has a body floor, two laterally spaced body sides with vehicle doors disposed therein, and at least one vehicle seat mounted for longitudinal adjustment movements along the body floor, said protective device assembly comprising:

a seat reinforcing element extending transversely of said compartment, said seat reinforcing element including impact plates at respective ends thereof, respective side reinforcing elements in each of said body sides, said side reinforcing elements including respective impact plates at ends thereof facing toward said seat reinforcement elements, at least one of said reinforcing elements being lengthwise adjustable between a normal driving condition with said respective facing impact plates spaced from one another and a side collision condition with said respective facing impact plates abutting one another so gaps are eliminated between said reinforcing elements, and a collision sensor activated actuator operable to forceably move said at least one of said reinforcing elements from the normal driving condition to the side collision condition to thereby form a continuous side collision force transmitting assembly of abutting reinforcing elements without said gaps therebetween and extending over the entire lateral width of said compartment.

17. The protective device assembly according to claim 16, wherein said compartment has a center console and respective seats at both sides of the console, wherein in each of said body sides, said seats, and said center console the respective reinforcing element is provided.

18. Passenger compartment of a vehicle body comprising:

a body floor, at least two vehicle doors integrated into two body sides, a center console attached centrally to the body floor, a vehicle seat on each side of the center console located respectively between the center console and one of the vehicle doors, said seats being displaceable lengthwise on the body floor, and a protective device assembly that protects a seat user in the event of a side collision, said protective device assembly including respective reinforcing elements integrated into each said vehicle door, each said vehicle seat, and the center console, said reinforcing elements extending transversely to a lengthwise axis of the compartment, said protective device assembly also having impact plates located between said reinforcing elements, with the reinforcing elements being arranged so that in a side collision said reinforcing elements abut one another by the impact plates, wherein at least one of the reinforcing elements that abut one another in a side collision extend transversely to the lengthwise axis of the compartment and are designed for a maximum length that can be increased in such fashion that all gaps that exist in a pre-collision state of the passenger compartment between the reinforcing elements and the impact plates in a supporting direction are eliminated, and wherein an actuator is provided that can be activated in the event of a side collision, said actuator adjusting at least one of the reinforcing elements to the maximum length.

19. Passenger compartment according to claim 18, wherein at least one of the reinforcing elements is divided into two elementary sections, said sections being axially displaceably guided in a guide, and wherein a driving and locking body actuated by the actuator is provided, said body penetrating between ends of the elementary sections that face one another to displace and lock the elementary sections in an extended position.

20. Passenger compartment according to claim 19, wherein elementary sections of the respective reinforcing element forceably abuts wedge-shaped bevels formed on the driving and locking body with elementary section ends facing one another.

21. Passenger compartment according to claim 19, wherein one of the reinforcing elements whose length can be increased is located inside each said vehicle seat.

22. Passenger compartment according to claim 19, wherein one of the reinforcing elements whose length can be increased is provided in each said vehicle door and in the center console.

23. Passenger compartment according to claim 19, wherein respective ones of the impact plates located on ends of the reinforcing elements that face one another each extend over a range of a predetermined seat adjustment path, including lengthwise and vertical adjustment.

24. Passenger compartment according to claim 19, wherein the reinforcing elements are made of a high-strength material, such as metal or KEVLAR.

25. Passenger compartment according to claim 19, wherein respective ones of the impact plates are integrated into the vehicle doors, the center console, and the vehicle seats and are covered by respective upholstery, and wherein a tear seam is provided in the upholstery in the vicinity of the impact plates.

26. Passenger compartment according to claim 18, wherein at least one of the respective reinforcing elements is divided into two elementary sections, said sections being received axially displaceably in a guide profile, wherein the actuator is designed as a propellant charge located between the elementary sections in the guide profile, and wherein a lock is provided between each elementary section and guide profile, said lock becoming automatically operative in a displacement position of the elementary sections that causes locking of all said reinforcing elements.

27. Passenger compartment according to claim 26, wherein one of the reinforcing elements whose length can be increased is located inside each said vehicle seat.

28. Passenger compartment according to claim 26, wherein one of the reinforcing elements whose length can be increased is provided in each said vehicle door and in the center console.

29. Passenger compartment according to claim 26, wherein respective ones of the impact plates located on ends of the reinforcing elements that face one another each extend over a range of a predetermined seat adjustment path, including lengthwise and vertical adjustment.

30. Passenger compartment according to claim 26, wherein the reinforcing elements are made of a high-strength material, such as metal or KEVLAR.

31. Passenger compartment according to claim 26, wherein respective ones of the impact plates are integrated into the vehicle doors, the center console, and the vehicle seats and are covered by respective upholstery, and wherein a tear seam is provided in the upholstery in the vicinity of the impact plates.

* * * * *